(12) United States Patent
Hawkins

(10) Patent No.: US 7,091,629 B2
(45) Date of Patent: Aug. 15, 2006

(54) ENGINE CONTROL SYSTEM AND METHOD OF AUTOMATIC STARTING AND STOPPING A COMBUSTION ENGINE

(75) Inventor: Jeffery Scott Hawkins, Farmington Hills, MI (US)

(73) Assignee: Detroit Diesel Corporation, Detroit, MI (US)

( * ) Notice: Subject to any disclaimer, the term of this patent is extended or adjusted under 35 U.S.C. 154(b) by 450 days.

(21) Appl. No.: 10/603,014

(22) Filed: Jun. 24, 2003

(65) Prior Publication Data

US 2004/0262995 A1 Dec. 30, 2004

(51) Int. Cl.
*B60R 22/00* (2006.01)
(52) U.S. Cl. .................. 307/10.6; 123/179.4
(58) Field of Classification Search ............. 307/10.6; 123/179.4
See application file for complete search history.

(56) References Cited

U.S. PATENT DOCUMENTS

| | | | |
|---|---|---|---|
| 3,906,437 A * | 9/1975 | Brandwein et al. ......... 340/945 |
| 4,520,271 A * | 5/1985 | Goertler et al. ............ 290/38 C |
| 5,072,703 A * | 12/1991 | Sutton ..................... 123/179.4 |
| 5,275,011 A | 1/1994 | Hanson et al. |
| 5,317,998 A * | 6/1994 | Hanson et al. ............ 123/179.4 |
| 5,477,827 A | 12/1995 | Weisman, II et al. |
| 5,732,676 A | 3/1998 | Weisman et al. |
| 6,104,977 A | 8/2000 | Avery, Jr. |
| 6,330,873 B1 | 12/2001 | Letang et al. |
| 6,351,703 B1 | 2/2002 | Avery, Jr. |
| 6,363,906 B1 | 4/2002 | Thompson et al. |
| 6,523,525 B1 | 2/2003 | Hawkins |
| 6,588,449 B1 * | 7/2003 | Kippe ..................... 137/399 |
| 2003/0060949 A1 * | 3/2003 | Letang et al. ............ 701/29 |

* cited by examiner

*Primary Examiner*—Brian Sircus
*Assistant Examiner*—Daniel Cavallari
(74) *Attorney, Agent, or Firm*—Reising, Ethington, Barnes, Kisselle, P.C.

(57) ABSTRACT

An engine control system (10) operates off a microprocessor of an engine control module, ECM (62), which will automatically start a combustion engine (12) upon any one of a series of enabler signals (68, 67, 70) indicative of low battery voltage, low cab temperature and/or low engine temperature. The system (10) also includes safety measures which will override the automatic starting of the engine. For instance, the vehicle will not automatically start if a vehicle speed is detected, if the parking brake is not set, if the ignition key (50) is not in the "on" position, or if the hood (56) is open. Moreover, the system (10) is configured not to start if the fuel level is low, thus preventing an unintended depletion of fuel which could strand the vehicle and operator.

15 Claims, 6 Drawing Sheets

ENGINE CONTROL SYSTEM AND METHOD OF AUTOMATIC STARTING AND STOPPING A COMBUSTION ENGINE

TECHNICAL FIELD

The present invention relates to an engine control system and more particularly to a method of automatically starting a combustion engine.

BACKGROUND OF THE DISCLOSURE

Combustion engines and particularly diesel engines have a wide variety of applications including passenger vehicles, marine vessels, earth-moving and construction equipment, stationary generators, and on-highway trucks, amongst others. Electronic engine controllers or electronic control modules, ECM, provide a wide range of capabilities which enhance engine operation, tailor engine performance to a particular application or operator, and reduce or eliminate undesirable characteristics typically associated with diesel engines, such as noise, smoke, or difficult starting. One feature which has been provided for various types of engines is the ability to automatically start and/or stop the engine based on various engine or ambient/environmental parameters.

For instance, in any of the above mentioned applications of diesel engines, automatic starting of the engine is desirable to preserve or maintain operating parameters necessary to later assure reliable starting of the engine when the operator intends to use the vehicle, equipment or truck. Automatic starting of the engine can recharge a battery with a depleting power supply, or will maintain engine oil and/or coolant temperatures above pre-established lower limits in cold weather which would otherwise prevent or hinder engine starts.

Moreover, truck owners seek to provide conveniences or amenities for the driver or operator because it is often difficult to attract and retain drivers in a competitive job market. For this application, automatic start/stop features are used to balance the fuel economy interests of the owner while providing conveniences to the driver, such as automatically starting and stopping the engine while the driver is parked to keep the cab temperature comfortable.

Prior to automatic starting of the engine, a series of interlocks or switches, which are monitored by the ECM, must be closed before the engine will start. These switches include a digital input park brake, a hood tilt switch, a transmission in neutral position switch, and a park brake switch. Unfortunately, amongst all of the known automatic engine start enablers, the engine will not be prevented from starting if the fuel level is low (i.e. below a predetermined level). Hence, automatic starting of the engine can run the vehicle or truck out of fuel, which would inadvertently leave the operator and vehicle stranded.

SUMMARY OF THE DISCLOSURE

In accordance with one aspect of the invention, an engine control system operates off a microprocessor of an engine control module, ECM, which will automatically start a combustion engine upon an enabler signal indicative of low battery voltage, high or low cab temperature and/or low engine temperature. The system also includes safety measures which will override the automatic starting of the engine. For instance, the vehicle will not automatically start if a vehicle speed is detected, if the parking brake is not set, if the ignition key is not in the "on" position, or if the hood is open. Moreover, the system is configured not to start if the fuel level is low (i.e. below a predetermined level), thus preventing an unintended depletion of fuel which could strand the vehicle and operator.

The ECM controls a series of fuel injectors and an engine starter motor for starting and stopping the engine at idle based upon a series of enabler inputs to the ECM which include a low battery voltage signal for ensuring minimum power is available to start the engine, a low engine temperature signal to ensure engine temperature does not drop so low that starting is difficult (a concern especially common for diesel engines) and a cab temperature range signal which will signal an engine start if the cab temperature wanders outside of a comfort range determined by the operator.

The overriding safety measures preferably entail a plurality of switches wired in series forming a grounded circuit which sends an input signal to the ECM. The fuel level feature is preferably a switch wired in series with the plurality of switches functioning as the overriding safety measures.

In accordance with another aspect of the invention, a method for automatically starting an internal combustion engine installed in a vehicle having an electronic engine control system in communication with a starter motor and a plurality of fuel injectors includes determining that one of three conditions exist, namely a voltage of a battery is below a predetermined limit, a temperature of the engine is below a predetermined limit, or a temperature of a cab of the vehicle is outside of a predetermined temperature range. The method also confirms that a hood is closed, that a transmission is in neutral, and that a park brake is set; and confirms that a fuel level is above a predetermined level. The engine is then started after the above conditions are met.

In accordance with another aspect of the invention, an engine control system for automatically starting and stopping a vehicle combustion engine at idle includes an engine control module for receiving inputs and providing an initiating output for starting and stopping the engine. An input is connected to the engine control for sending an initiating signal to the engine control module from a monitoring sensor to allow the engine control system to automatically start the engine. A first safety enabler circuit monitors a first set of parameters whereby each parameter is orientated with a respective grounded switch and opening of any one switch will open the circuit and disable the automatic start system preventing the engine control module from starting said engine and wherein one of the switches is orientated with a predetermined level of fuel in a fuel tank for said engine.

Objects, features and advantages of the present invention include an improved engine controller which prolongs engine life, reduces maintenance and assures reliable engine starts by monitoring outside conditions which would otherwise be adverse to the engine if not automatically started. Moreover, fuel economy is improved via the automatic shutting down of the engine when not needed, safety is enhanced via monitoring of various parameters which override automatic starting and stopping and inadvertent stranding of the operator and vehicle is prevented via incorporation of the fuel level input to the ECM.

BRIEF DESCRIPTION OF THE DRAWINGS

The presently preferred embodiments of the invention are disclosed in the following description and in the accompanied drawings wherein.

DETAILED DESCRIPTION OF THE PREFERRED EMBODIMENTS

Figure 1:
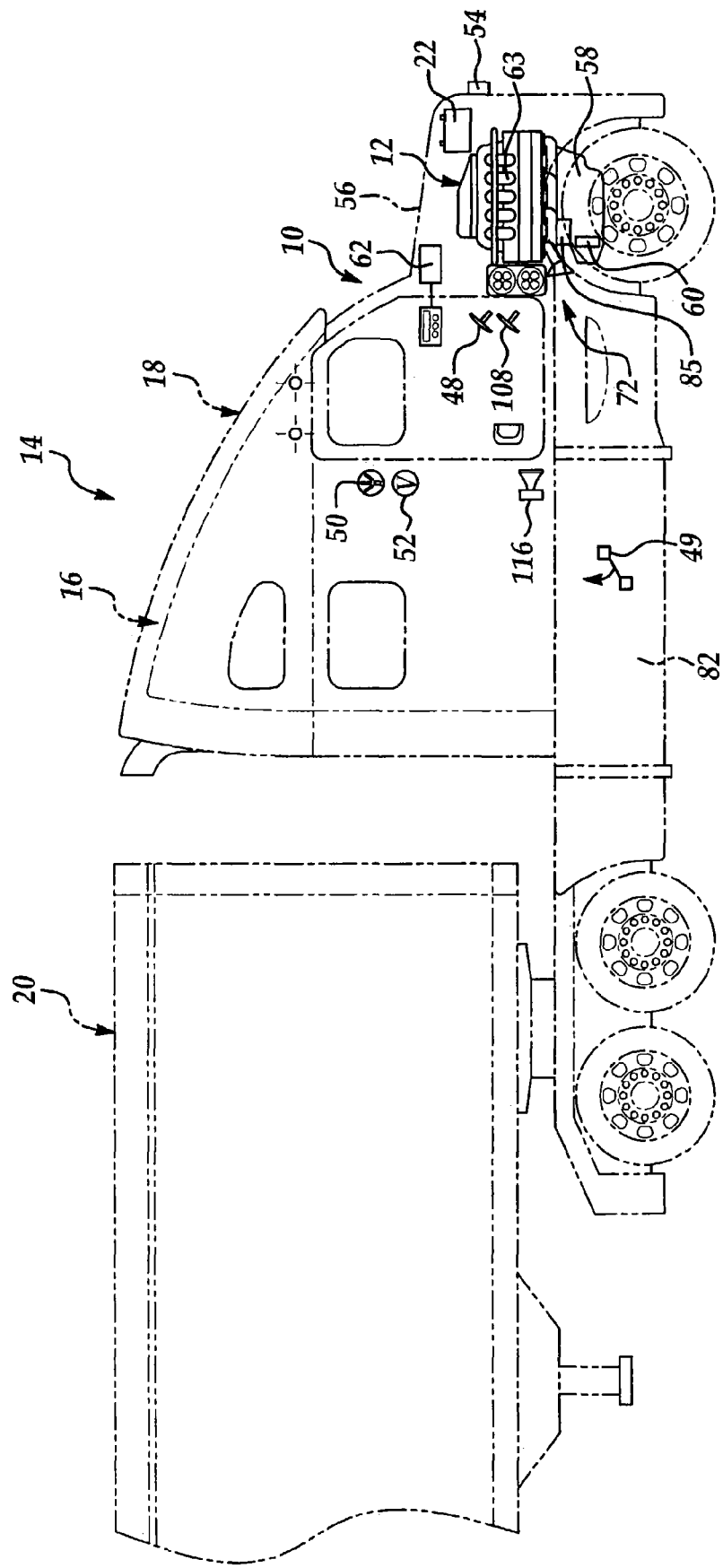
FIG. 1 is a schematic/block diagram of an engine control system of the present invention illustrated in a semi-truck environment.

Referring to FIG. 1, an engine control system 10 of the present invention automatically starts and stops a combustion engine 12 at idle. Preferably, the engine 12 is of a diesel type and utilized within large vehicle applications such as trucks or tractors 14 having an operator sleeping compartment 16, a forward cab 18 and a semi-trailer 20. The diesel engine 12 is installed in the truck 14 and interfaces with various sensors, switches, and actuators located on the engine 12, cab 18, and semi-trailer 20. In other applications, the engine 12 may be used to operate industrial and construction equipment or in stationary applications for driving generators and/or pumps and the like.

The engine control system 10 will automatically stop and restart the engine 12 when required in order to keep the engine temperature above a specified value (such as sixty degrees Fahrenheit), a battery 22 charged, and/or the vehicle interior, sleeping compartment 16 or cab 18 in the desired temperature range. Benefits of the system include an overall reduction in exhaust emissions and noise, and improved starter and engine life via starting of a warm engine as oppose to a cold engine and operator comfort while sleeping in the sleeping compartment 16.

Figure 2:
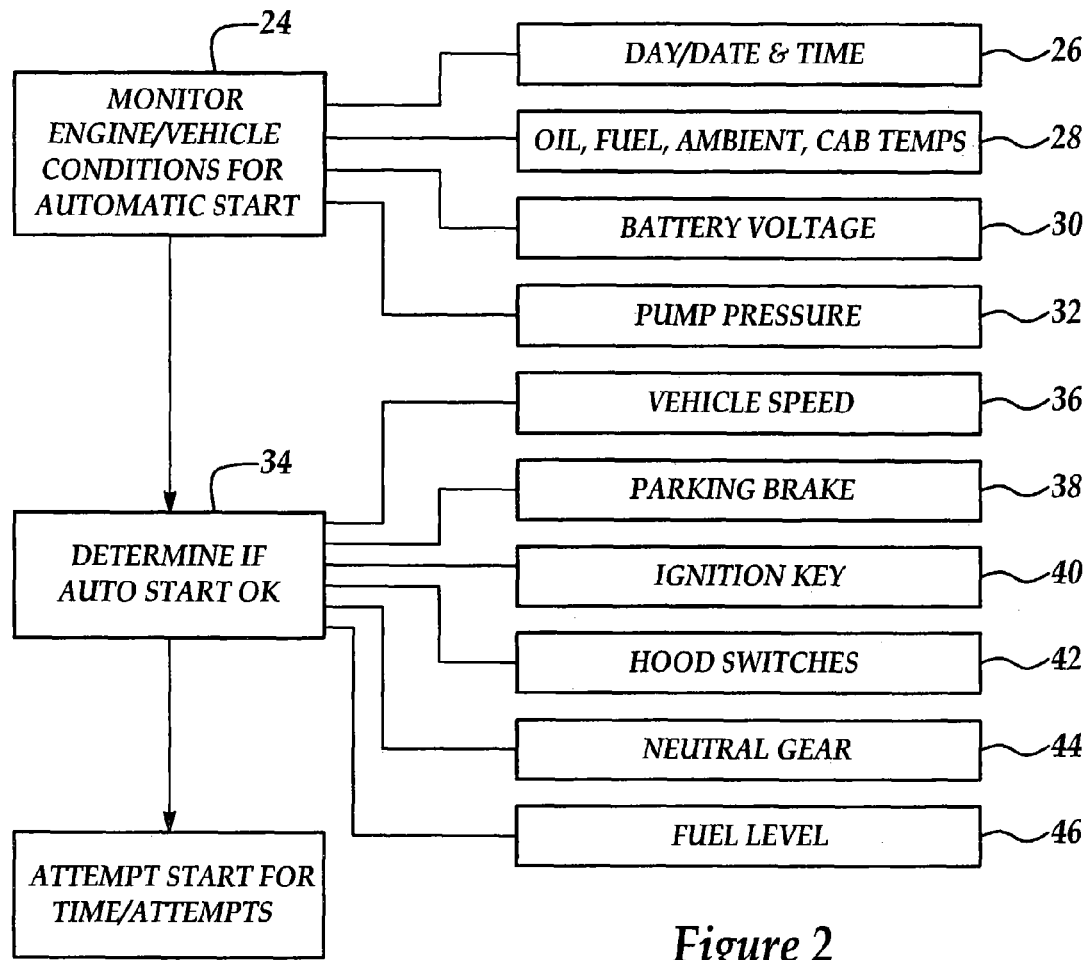
FIG. 2 is a flow chart illustrating enablement criteria of the engine control system.

Referring to FIG. 2, the engine control system 10 monitors various engine/vehicle conditions, as represented by block 24, to determine if automatic starting of the engine 12 is permissible. Depending upon the particular application, the system 10 may include one or more event triggers which initiate an automatic engine start. For example, the current day/date and time as represented by block 26 may be used to automatically start the engine 12. The automatic start may be programmed by the engine operator, a fleet owner/operator, or may be remotely programmed as described in Avery, U.S. Pat. No. 6,351,703, filed Jun. 6, 2000, incorporated herein by reference. Other events which may trigger an automatic engine start include various engine/vehicle temperatures such as oil temperature, fuel temperature, ambient temperature, and/or cab or coach temperature as represented by block 28. Likewise, the voltage of battery 22 may be monitored to trigger an automatic start on low voltage as represented by block 30. For applications utilizing an auxiliary pump, such as irrigation systems or fire truck applications and the like, pump pressure may trigger an automatic engine start as represented by block 32. Various other engine/vehicle conditions may trigger an automatic engine start depending upon the particular application. Likewise, more than one condition may be required to trigger an automatic engine start.

Block 34 of FIG. 2 represents an enabler sequence which determines whether conditions are acceptable for automatically starting the engine 12 via the engine control system 10. Engine/vehicle parameters which may be monitored include vehicle speed, parking brake status, ignition key position, hood switches, neutral gear and/or fuel level, as represented by respective blocks 36, 38, 40, 42, 44 and 46.

In relation to blocks 36 and 38, vehicle speed and/or the position of a parking brake or switch 48 (as best shown in FIG. 1) may be monitored to determine whether the vehicle/equipment is stationary prior to performing an automatic start. In other words, the parking brake 48 must be in a "set" position before automatic starting of the engine 12. In relation to block 40, an ignition key or switch 50 may be used as a master switch to initiate the automatic start sequence and to override or disable the engine control system 10 by turning the ignition key to the "off" position and/or removing the ignition key. Alternatively, the ignition switch 50 may be used for security reasons and another push button or switch 52 can be incorporated, in conjunction with the key switch 50, to select automatic and/or manual starting of the engine 12. That is, the ignition key 50 must be in an "on" position and the push button 52 must be in an "on" position before the engine control system 10 is enabled for automatically starting the engine 12. In relation to block 42, a hood switch 54 provides the indication that an engine hood 56 and/or compartment doors are closed thus preventing an automatic start while the engine 12 is being serviced, for example. With respect to block 44, a transmission 58 of the engine 12 is monitored to assure that the transmission is in a neutral gear as indicated by switch 60 prior to an automatic start. This feature may also be used as a security measure to keep the transmission 58 in neutral and make it more difficult to move the vehicle/equipment without proper authorization. With respect to block 46 of FIG. 2, a fuel level switch 49, as best illustrated in FIGS. 1 and 3, will override an automatic engine start if the fuel level is below a predetermined level which can be pre-programmed as explained further.

Figure 3:
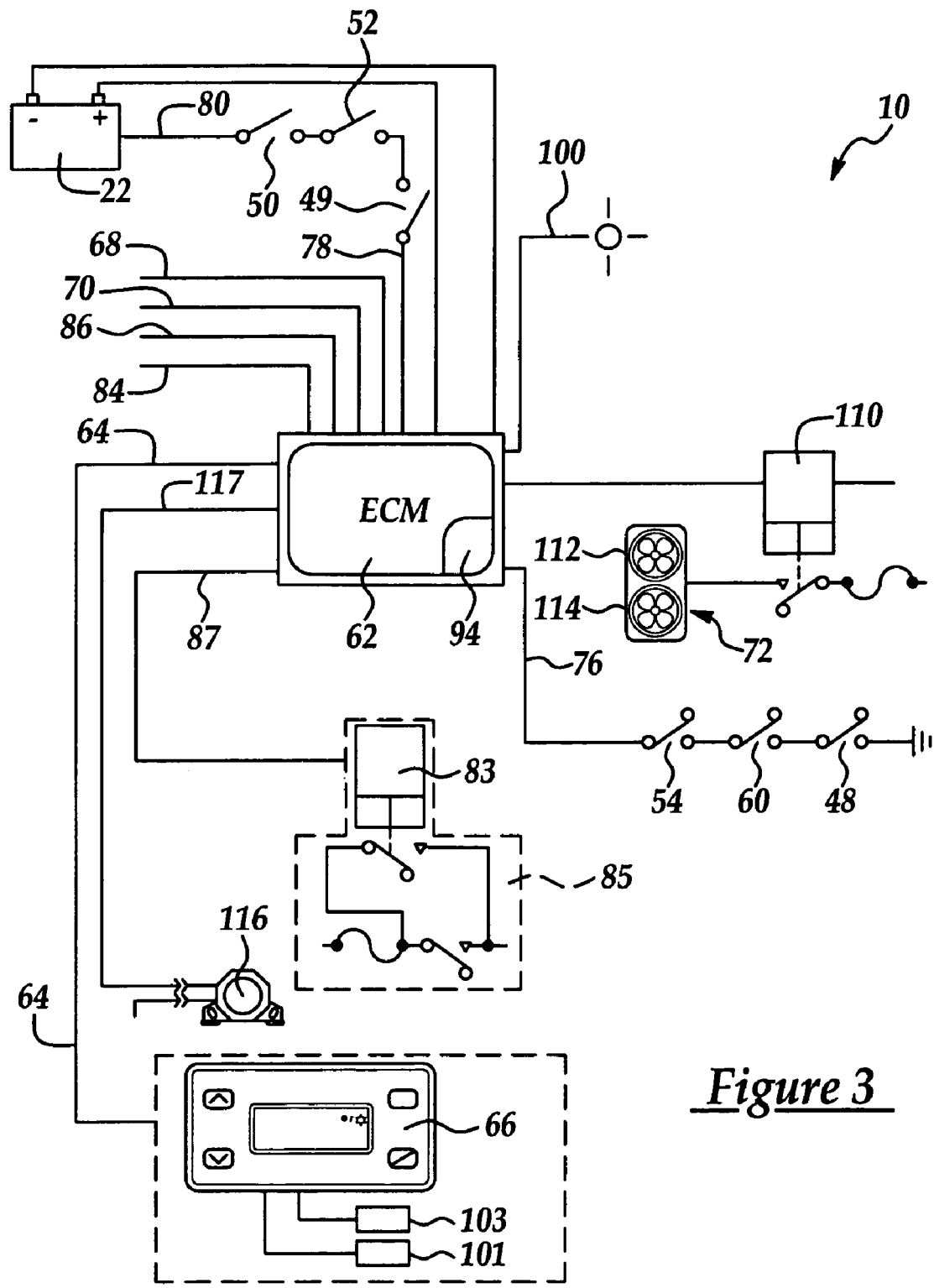
FIG. 3 is a logic schematic of the engine control system.

Referring to FIGS. 1 and 3, an electronic control module, ECM 62, of the engine control system 10 receives signals generated by the engine and vehicle sensors and processes the signals to control engine and/or vehicle actuators such as a plurality fuel injectors 63 necessary to automatically start and stop the engine 12. The ECM 62 preferably includes computer-readable storage media for storing data representing instructions executable by a computer of the ECM 62 to control the engine 12.

Referring to FIG. 3, the ECM 62 processes an ambient temperature analog input 64 of the cab 18 and/or sleeper compartment 16 from a programmable temperature controller 66, a battery voltage input 68 monitored off the battery 22, and an engine temperature input 70; any one of which is a monitored engine/vehicle condition (as represented by block 24 of FIG. 2) which can initiate the sequencing of an automatic engine start. For instance, if the cab 18 temperature is not within a prescribed comfort range, the engine 12 will automatically start to run heating and air conditioning system 72. Likewise, if the battery voltage is below a prescribed value, the engine 12 will start to recharge the battery 22 and if the engine temperature drops below a prescribed value, the engine 12 will start to ensure reliable operation during extreme cold weather conditions.

To determine if automatic starting of the engine is permissible (as represented by block 34 of FIG. 2), the ECM 62 also processes a digital first enabler input 76 which preferably is a grounded circuit having the hood switch 54, the parking brake switch 48 and the neutral gear switch 60 orientated in series. Similarly, the ECM 62 processes a second enabler circuit or input 78 having the ignition switch 50 wired between a positive lead 80 of the battery 22 and the fuel level switch 49 wired in series between the ignition switch 50 and the ECM 62. The circuit is completed and the input 78 provides a hot enable signal to the ECM 62 when both the ignition switch 50 is closed or in the "on" position and the fuel level switch 49 is closed indicating a sufficient amount of fuel in a fuel tank 82 of the truck 14. The fuel level switch 49 is a float-type switch located within the fuel tank 82. With both inputs 76 and 78 enabled, the ECM 62 will signal a starter relay 83 of an engine starter 85 to close via an output 87.

Figure 5:
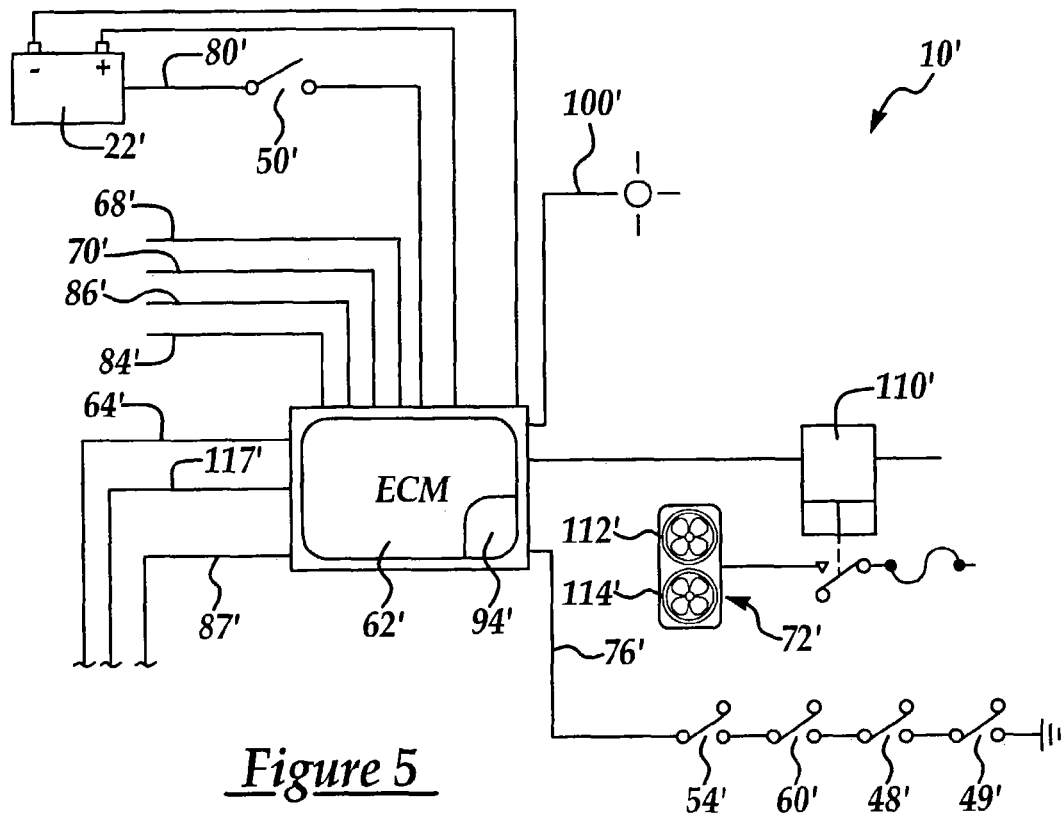
FIG. 5 is a partial logic schematic of a second embodiment of an engine control system.

Referring to FIG. 5, a second embodiment of an engine control system 10' illustrates a modified first enabler input or circuit 76' is illustrated. The circuit 76' includes a fuel level switch 49' wired in series to the hood switch 54', the neutral switch 60' and the parking brake switch 48'. All of the switches 54', 60', 48' and 49' must be closed, thus grounding the circuit 76' before automatic starting of the engine 12 is enabled. Other methods of communicating the switch or circuit 76' status to the ECM 62 can be used. For instance, the ground can be replaced with a supply voltage and the logic or positioning (i.e. open or closed) of the switches reversed. Because automatic or unintentional and premature shutdown of the engine 12 is not typically desirable on low fuel level, the ignition or second enabler circuit 78, as illustrated in FIG. 3, would require another circuit (not shown) wired in series across the fuel level switch 49 to prevent unintentional shutdown on low fuel level. For this reason, and when automatic shutdown on low fuel level is not desired, the embodiment illustrated in FIG. 5 is more simplistic and thus preferable over that embodiment illustrated in FIG. 3.

Figure 6:
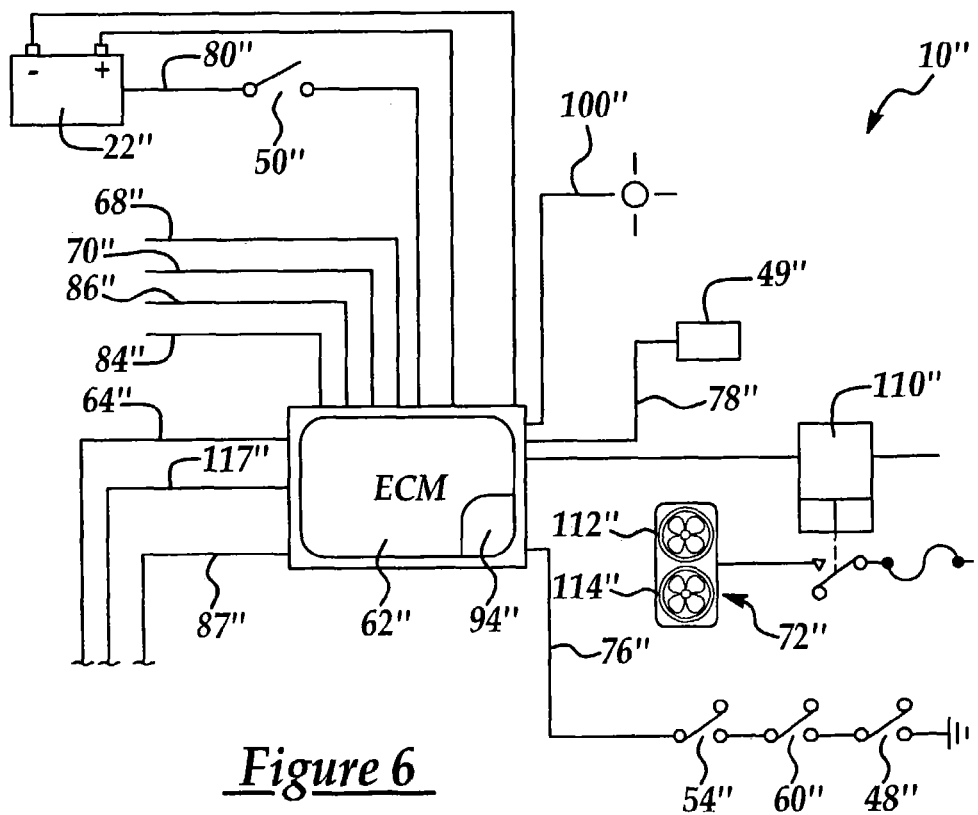
FIG. 6 is a partial logic schematic of a third embodiment of an engine control system.

Referring to FIG. 6, a third embodiment of an engine control system 10" illustrates a modified second enabler input or circuit 78". Circuit 78" is independent of the ignition switch 50" and directly inputs an enabler signal to the ECM 62" from a signal device 49" which measures fuel level. The device 49" can be an analog voltage sensor, a switch that triggers on a pre-set low fuel level which then sends a digital signal via circuit 78" to the ECM 62", or a data link device. The software utilized in the ECM 62" is modified from the software used in ECM 62 and ECM 62', thus enabling 62" to accept input from circuit 78" and enable processing of the enabler signal.

Referring to FIG. 3, the ECM 62 (and similarly for ECM 62' and ECM 62") also processes a series of shutdown enabler inputs which permit automatic shutdown of the engine 12 provided certain criteria are met. The shutdown enablers include a vehicle speed input 84 used as a safety measure preventing shutdown if the vehicle is moving. An engine speed input 86 requires that the engine 12 be at idle before shutdown is permitted. In addition, the engine temperature input 70 prevents automatic shutdown of the engine 12 if the engine temperature is below a prescribed value.

Depending upon the particular application, the engine control system 10 may include various types of sensors to monitor engine and vehicle operating conditions. For example, variable reluctance sensors may be used to monitor crankshaft position and/or engine speed. Variable capacitance sensors may be used to monitor various pressures such as barometric air, manifold, oil gallery, and optional pump pressures. Variable resistance sensors may be used to monitor positions such as a throttle (accelerator foot pedal) position. Magnetic pick-up sensors may be used to sense vehicle speed, accumulate trip distance, and for various other vehicle features. Likewise, thermistors may be used to monitor various temperatures such as coolant, oil, and ambient air temperatures, for example. In one embodiment of the present invention, engine sensors include a timing reference sensor, TRS, which provides an indication of the crankshaft position and may be used to determine engine speed. An oil pressure sensor and oil temperature sensor are used to monitor the pressure and temperature of the engine oil, respectively.

Figure 4C:
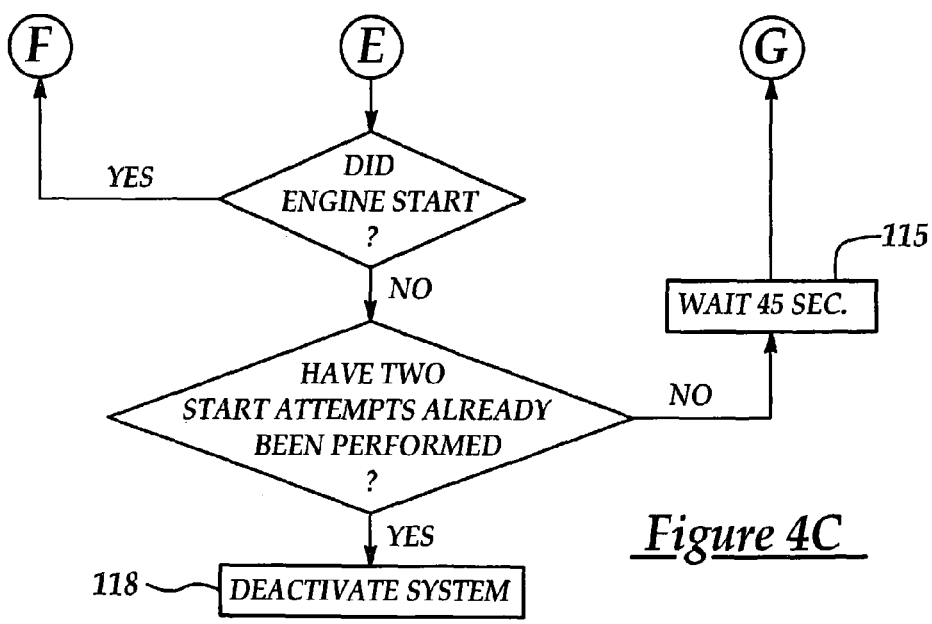
FIG. 4A–4C is a logic/decision chart illustrating operation of the engine control system.
Figure 4A:
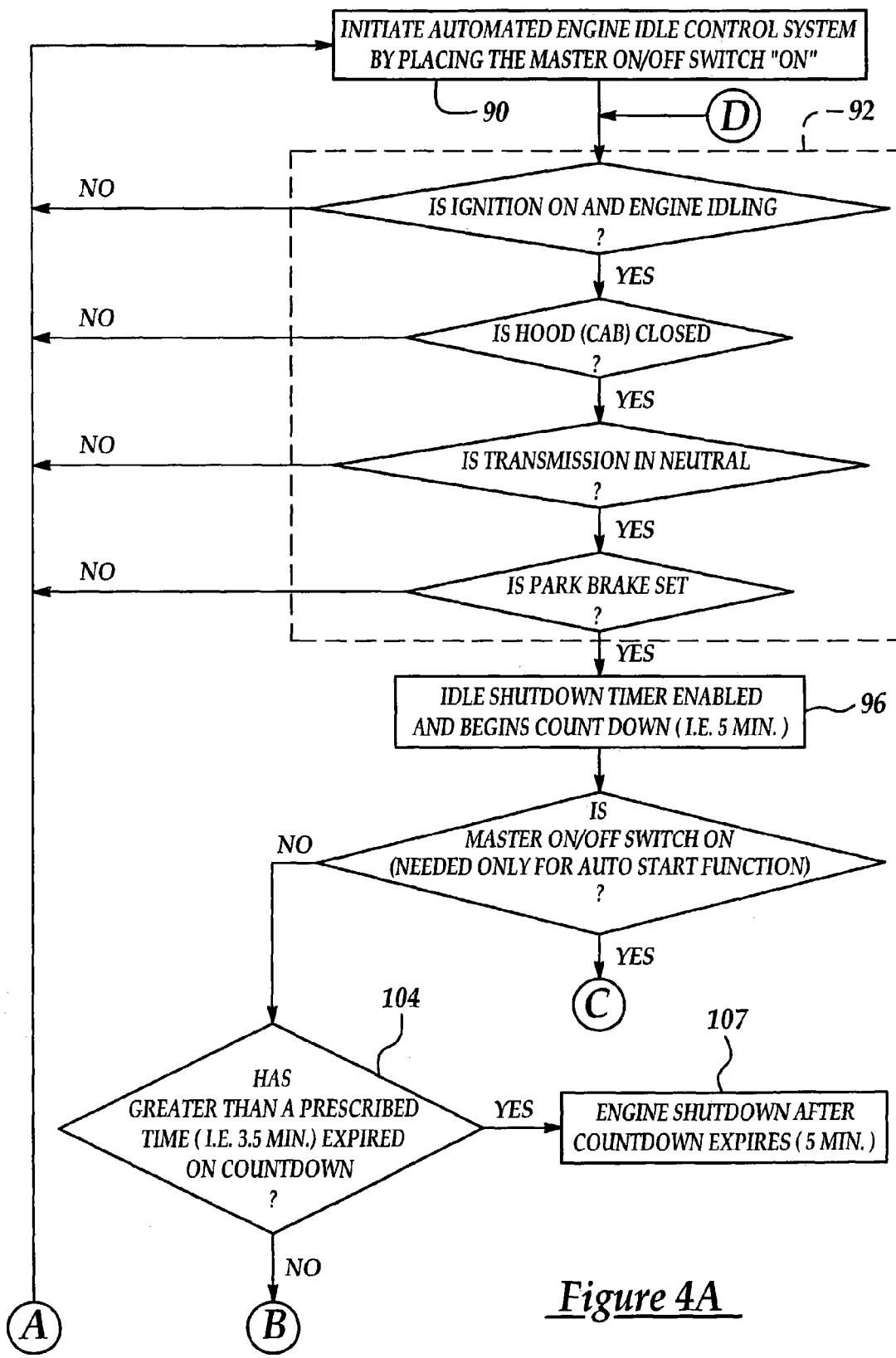
Figure 4B:
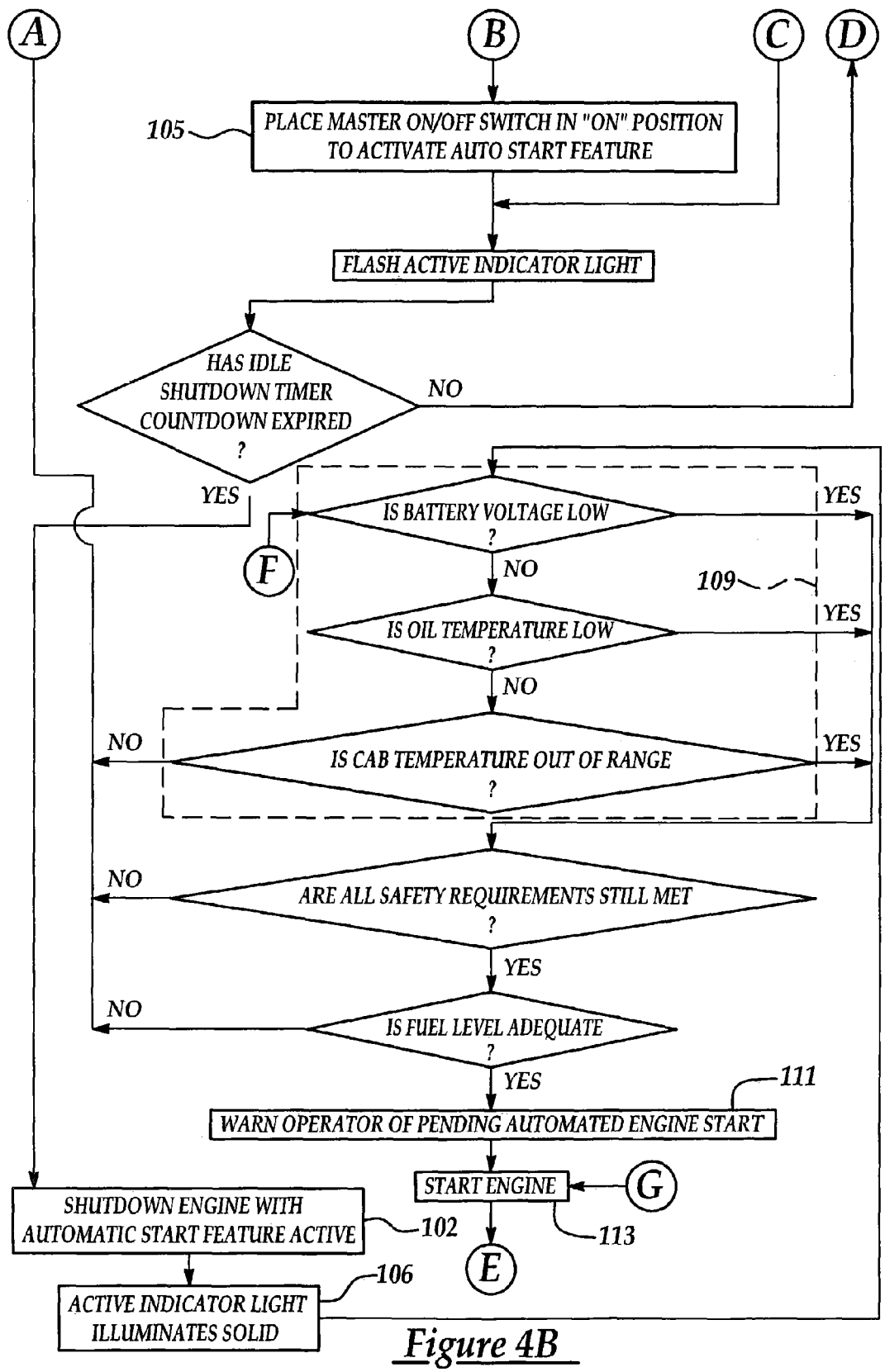

Referring to FIGS. 4A–C, in order for the operator to utilize an automatic start feature of the engine control system 10 the master on/off switch 52 must be placed in the "on" position (represented by block 90) and a series of conditions or safety features (represented by block 92) must be met and are thus continuously monitored by the ECM 62 when the system is initiated. For instance, the ignition switch 50 must be in the "on" position with the engine 12 idling, the hood 56 or any other compartment doors must be closed, the transmission 58 must be in neutral, and the park brake 48 must be "set." With these conditions met, and regardless of which position the master on/off switch 52 is in, a programmable idle shutdown timer 94 integral to the software of the ECM 62, as shown in FIG. 3, is enabled and begins a countdown of a prescribed time, of for instance approximately five minutes (represented by block 96). With the countdown started and with the master on/off switch 52 in the "on" position, an active indicator light or alarm 100 will begin flashing indicating the automatic start feature is active, thus the engine 12 will automatically restart when needed after the countdown expires and the engine 12 automatically shuts down (represented by block 102).

Assuming the automatic start master on/off switch 52 was not previously placed in the "on" position and the countdown of the timer 94 has already begun, the system 10 will allow the switch 52 to be turned "on" within a prescribed lapse of time during the countdown (represented by diamond 104). For instance, the operator can move the switch to "on" within the first 3.5 minutes of the five minute countdown which will activate the flashing of light 100, as best shown by block 105. Although not illustrated, the engine control system 10 will allow operation of all electronic control features while the active light 100 is flashing.

If the master on/off switch 52 is not timely placed in the "on" position, the indicator light 100 will not flash and countdown of the timer 94 will eventually expire thus automatically shutting down the engine 12 without the ability to automatically re-start, as best represented by block 107 of FIG. 4A.

The engine 12 will shutdown via the idle shutdown timer if any one of the following two conditions occur; the engine 12 has been idling for a specified time period, or the engine 12 has been idling for a specified time period and the ambient temperature is within a specified range. In order for the idle shutdown timer of the ECM 62 to automatically shutdown the engine 12, the following conditions must be met for the entire time-out period; the engine temperature remains above a present value such as one hundred and four degrees Fahrenheit, the engine operation is at idle or at a minimum variable speed governor, VSG, the parking brake interlock digital input remains switched to battery ground, the OEM supplied interlocks remain enabled, and the ignition switch 50 remains in the "on" position.

When the engine 12 is shutdown by the idle shutdown timer 94, fueling to a series of injectors 63 of the engine 12 is stopped by the ECM 62, however, the ignition switch 50 or circuit remains active. For manual start of the engine 12 by the driver, the ignition switch 50 must be cycled to the "off" position to deactivate the idle shutdown timer 94, and the driver must wait for a pre-determined time such as ten seconds before the driver can cycle the ignition switch 50 back to the "on" position to manually start the engine 12. The CEL or indicator light 100 will blink to indicate when the engine has shutdown via the idle timer 94.

With the automatic starting feature activated, the countdown expired, and the engine 12 automatically shutdown, the active indicator light 100 will stop flashing and illuminate solid/steadily (represented by block 106). At this point, the operator will no longer be able to use other electronic control features including the electronic throttle 108 (see FIG. 1) until the park brake 48 is released, one of the safety conditions are broken (block 92), or the master on/off switch 52 is turned "off."

With the engine 12 shutdown and the active indicator light 100 illuminated steadily, the engine control system 10 will monitor various vehicle and engine parameters to determine if an automatic start of the engine 12 is desirable (see battery voltage input 68, thermostat input 64 and engine temperature input 70 of FIG. 3; and block 109 of FIG. 4B). These parameters are divided into two modes of operation being an "engine mode" and a "thermostat mode." With the engine control system 10 active, the engine will either shutdown if control parameters are satisfied, or ramp to a pre-established engine speed such as 1100 rpm.

When the engine idle control system is in the "engine mode," the engine 12 will automatically start when the battery voltage drops below a pre-set level, for example below 12.2 volts of a twelve volt system or 24.4 volts for a twenty-four volt system. Once started by a signal of the low voltage input 68, the engine 12 will run for a pre-set time period, such as twenty minutes to two hours depending upon the type of engine or application. Also, when in the "engine mode," the engine 12 will automatically start when the engine temperature input 70 signals the oil or engine temperature has dropped below a pre-set temperature such as sixty degrees Fahrenheit and will automatically shutdown when the oil temperature reaches one hundred and four degrees Fahrenheit.

The "thermostat mode" of the automatic engine control system 10 is advantageous to truck owners seeking to provide conveniences or amenities for the driver or operator because it is often difficult to attract and retain drivers in a competitive job market. In this mode, automatic engine start/stop features are used to balance the fuel economy interests of the owner while providing conveniences to the driver, such as automatically starting and stopping the engine 12 while the driver is parked to keep the cab 18 or sleeper compartment 16 temperature comfortable. Likewise, after the engine 12 has been idling at a specified period of time, or after the engine 12 has been idling at a pre-set period of time and the ambient temperature is within a specified range, the automatic engine idle control system 10 via the idle shutdown timer 94 will automatically shut down the engine 12, as previously described.

When the engine control system 10 is in the "thermostat mode," the thermostat controller 66 must be turned "on" which causes "engine mode" parameters as well as the interior cab temperature to be monitored. The thermostat controller 66 informs the ECM 62 via the thermostat input signal 64 of when to start/stop the engine 12 to keep the interior temperature within a specified range sensed by a termistor 101 and based on a thermostat setting entered by the operator into the thermostat controller 66, as best shown in FIG. 3. When in the "thermostat mode," the system 10 also monitors the outside or ambient temperature by way of a skin temperature sensor or thermistor 103 to determine if the ambient external temperature is extreme enough that the engine 12 should be run continuously.

Referring to FIG. 3, when in the "thermostat mode," any vehicle accessories connected to a vehicle power shutdown relay 110 will turn on for "thermostat mode" engine starts. In contrast, a heater fan 112 and an air conditioning fan 114 of the conditioning system 72 will remain off for the "engine mode" starts. Moreover, if the engine 12 is started on "engine mode," and the operator then requests the "thermostat mode," the heater and air conditioning fans 112, 114 of the conditioning system 72 will turn on after a pre-set delay, such as thirty seconds from when the "thermostat mode" is selected.

Automatic engine starting operation of the engine control system 10 requires that the ignition switch 50 is left in the "on" position. When active, the indicator light 100 within the cab 18 is illuminated (see block 106). The ECM 62 is then capable of determining when the engine 12 needs to start to charge the battery 22, warm the engine 12 or heat/cool the cab 18 or sleeper compartment 16 (see block 109). Just prior to starting, an audio alarm 116 will sound briefly (see block 111) via a pulse width modulated signal from an output 117 of the ECM 62. The starter motor 85 of the engine 12 will then engage and the engine 12 will start (see block 113).

If the engine 12 does not start, the engine control system 10 will attempt a second engine start after a preset delay time, such as approximately forty-five seconds (see block 115). The alarm 116 will sound a second time just prior to the second start attempt. If the engine 12 does not start after the second attempt, the system 10 will disarm for the rest of the ignition cycle, or that time in which the ignition switch 50 remains in the "on" position (see block 118). If the engine 12 does start, the engine will ramp up to a pre-established speed, such as approximately 1100 RPM. And, if the engine was started in the thermostat mode, the heater fan 112 or the air conditioning fan 114 will turn on after a pre-set time delay, such as approximately thirty seconds.

It is also foreseen that instead of switch 49, the engine control module may have an analog input from a fuel tank gauge and be pre-programmed with a fuel amount which if sensed below the pre-programmed level will prevent automatic starting of the engine.

It is also foreseen that the pre-programmed level may be adjustable by using a global positioning device, determining the location of the motor vehicle and determining with preloaded memory or an input signal the location and mileage from the nearest fuel station in or along the direction which the vehicle will head. In this way the fuel level parameter may be more individually categorized to the particular situation for the vehicle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The embodiments in which an exclusive property or privilege is claimed are defined as follows:

1. A method for automatically starting and stopping an internal combustion engine installed in a vehicle having an electronic engine control system in communication with a starter motor and a plurality of fuel injectors, the method comprising:
   (a) determining in any sequence that one of the following three conditions exists: a voltage of a battery is below a predetermined limit, a temperature of the engine is below a predetermined limit, or a temperature of a cab of the vehicle is outside of a predetermined temperature range;

(b) once a positive indication of one of said conditions exists; confirming that a hood is closed, that a transmission is in neutral, and that a park brake is set;

(c) confirming that a fuel level is above a predetermined level; and (d) starting the engine.

2. The method of automatically starting and stopping the combustion engine set forth in claim 1 further comprising warning an operator of a pending engine start before step (d).

3. The method of automatically starting and stopping the combustion engine set forth in claim 1 further comprising:

(e) confirming that an ignition switch is in an on position and the engine is idling after step (d); and (f) automatically shutting down the engine.

4. A method of automatically starting and stopping an internal combustion engine installed in a vehicle having an electronic engine control system in communication with a starter motor and a plurality of fuel injectors, the method comprising:

(a) determining that one of three conditions exist, a voltage of a battery is below a predetermined limit, a temperature of the engine is below a predetermined limit, or a temperature of a cab of the vehicle is outside of a predetermined temperature range;

(b) confirming that a hood is closed, that a transmission is in neutral, and that a park brake is set;

(c) confirming that a fuel level is above a predetermined level;

(d) starting the engine;

(e) confirming that an ignition switch is in an on position and the engine is idling;

(f) enabling an idle shutdown timer;

(g) initiating a pre-programmed countdown of the shutdown timer to automatic engine shutdown;

(h) confirming that an active switch has been placed in an on position prior to expiration of the countdown; and (i) automatically shutting down the engine.

5. The method of automatically starting the combustion engine set forth in claim 4 further comprising confirming that the hood is closed, and that the transmission is in neutral, and the park brake is set prior to step (f) and after step (e).

6. The method of automatically starting and stopping the combustion engine set forth in claim 5 further comprising warning an operator of a pending engine start immediately before step (d).

7. The method of automatically starting and stopping the combustion engine set forth in claim 6 further comprising:

confirming the engine did not start after step (d);

initiating a pre-programmed time delay;

attempting a second engine start;

confirming the engine did not start; and deactivating the engine control system.

8. An engine control system for automatically starting and stopping a vehicle combustion engine at idle via a series of fuel injectors and a starter motor, the engine control system comprising:

a battery having a positive lead;

an engine control module;

a first enabler circuit providing a digital input to the engine control module, the first enabler circuit having a park brake switch, a hood switch, and a neutral gear switch, wherein the park brake switch, the hood switch and the neutral gear switch are wired in series and grounded;

a fuel level switch engaged electrically to the engine control module for indicating a low fuel level condition below a predetermined amount which overrides automatic starting of the engine by the engine control system;

a second enabler circuit extending electrically between the positive lead and the engine control module, the second enabler circuit having an ignition switch having an on position for enabling the engine control system; and wherein the second enabler circuit has the fuel level switch which is wired in series between the ignition switch and the ECM.

9. An engine control system for automatically starting and stopping a vehicle combustion engine at idle via a series of fuel injectors and a starter motor, the engine control system comprising:

a battery having a positive lead;

an engine control module;

a first enabler circuit providing a digital input to the engine control module, the first enabler circuit having a park brake switch, a hood switch, and a neutral gear switch, wherein the park brake switch, the hood switch and the neutral gear switch are wired in series and grounded;

a fuel level switch engaged electrically to the engine control module for indicating a low fuel level condition below a predetermined amount which overrides automatic starting of the engine by the engine control system; and wherein the first enabler circuit has the fuel level switch which is wired in series with the park brake switch, the hood switch and the neutral gear switch.

10. The engine control system set forth in claim 9 comprising a low voltage input to the engine control module for initiating an automatic engine start on low battery voltage.

11. The engine control system set forth in claim 9 comprising an engine temperature input for initiating an automatic engine start on low engine temperature.

12. The engine control system set forth in claim 9 comprising:

a thermostat controller;

a thermostat input extended between the thermostat controller and the ECM; and a thermistor for measuring temperature within a cab of the vehicle and inputting the signal into the thermostat controller which outputs an initiating signal to the engine control module via the thermostat input.

13. An engine control system for automatically starting and stopping a vehicle combustion engine at idle; the system comprising:

an engine control module for receiving inputs and providing an initiating output for starting and stopping the engine, said engine control module determining in any sequence that one of the following three conditions exists: a voltage of a battery is below a predetermined limit, a temperature of the engine is below a predetermined limit, or a temperature of a cab of the vehicle is outside of a predetermined temperature range;

an input for sending an initiating signal to the engine control module from a monitoring sensor to allow said engine control system to automatically start said engine by at least in-part closing a starter relay; and a first safety enabler circuit monitoring a first set of parameters once a positive indication of one of said condition exists whereby each parameter is orientated with a respective grounded switch and opening of any one switch will prevent the engine control module from closing the starter relay thereby prevent starting of said engine; and wherein one of the switches is orientated with a predetermined level of fuel in a fuel tank for said engine.

14. An engine control system for automatically starting and stopping a vehicle combustion engine at idle; the system comprising:

an engine control module for receiving inputs and providing an initiating output for starting and stopping the engine determining in any sequence that one of the following three conditions exists: a voltage of a battery is below a predetermined limit, a temperature of the engine is below a predetermined limit, or a temperature of a cab of the vehicle is outside of a predetermined temperature range;

an input for sending an initiating signal to the engine control module from a monitoring sensor to allow said engine control system to automatically start said engine by closing a starter relay;

a first safety enabler circuit monitoring a first set of parameters once a positive indication of one of said conditions exists such that when any one of said parameters is outside of a predetermined range, the safety enabler circuit will prevent the engine control module from closing the starter relay; and one of the parameters in said first set of parameters being the level of fuel in a fuel tank for said engine and said predetermined range being above a predetermined level.

15. The method of automatically starting and stopping the combustion engine set forth in claim 3 further comprising the step of confirming that the vehicle is not moving and that the engine temperature is above a prescribed value at step (e).

* * * * *